J. W. Murrell,
Horse Power.

No. 106,194.  Patented Aug. 9, 1870.

United States Patent Office.

JAMES W. MURRELL, OF ELDORADO, ARKANSAS.

Letters Patent No. 106,194, dated August 9, 1870.

IMPROVEMENT IN HORSE-POWERS.

The Schedule referred to in these Letters Patent and making part of the same.

*To all whom it may concern:*

Be it known that I, JAMES W. MURRELL, of Eldorado, in the county of Union and State of Arkansas, have invented a new and useful Improvement in Horse-Powers; and I do hereby declare that the following is a full, clear, and exact description thereof, which will enable others skilled in the art to make and use the same, reference being had to the accompanying drawing forming a part of this specification.

This invention relates to improvements in horse-powers, and consists in the employment, on the driving-shaft to which the sweep is connected, and which is mounted vertically in a suitable portable frame, which also supports the counter-shafting, of a horizontal driving-wheel, provided with oblique teeth, gearing into a pinion also having oblique teeth, and arranged to revolve in a vertical plane and impart motion to a horizontal shaft, the teeth on both the driving-wheel and the pinion representing inclined planes, which may be varied to a considerable extent in the angle of the pitch, as found most desirable according to the case in hand.

The said improved power is also applicable, with a slight modification, for the application of steam or other power.

Similar letters of reference indicate corresponding parts.

A is the frame;
B, the main vertical shaft;
C, the sweep or arm for hitching the horses;
D is the large driving-wheel;
E, the pinion on the horizontal counter-shaft;
F, a multiplying shaft; and
G, the transmitting shaft;
H is the belt, transmitting the motion from the counter-shaft to the shaft F; and
I, a belt, working from the latter to the transmitting shaft G.

The teeth H of the driving-wheel D are placed obliquely across the face, and the teeth K of the pinion E are also arranged obliquely to correspond with those on the wheel D, which, passing between the teeth K, act on them in the manner of inclined planes, and impart rotary motion to the horizontal shaft, arranged tangentially to the face of the driving-wheel.

This mode of gearing is considered preferable for horse-power and other like apparatus to the ordinary spur or bevel cog-wheels.

Figure 1:
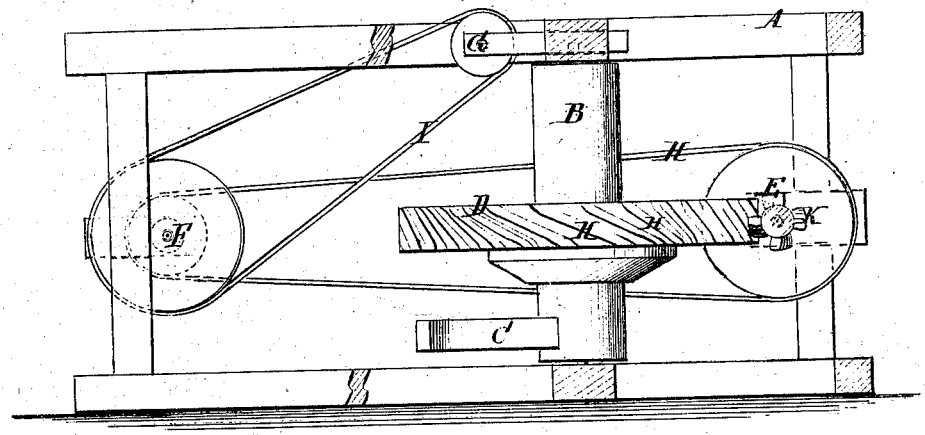
Figure 1 is a side elevation of my improved horse-power, partly sectioned.
Figure 2:
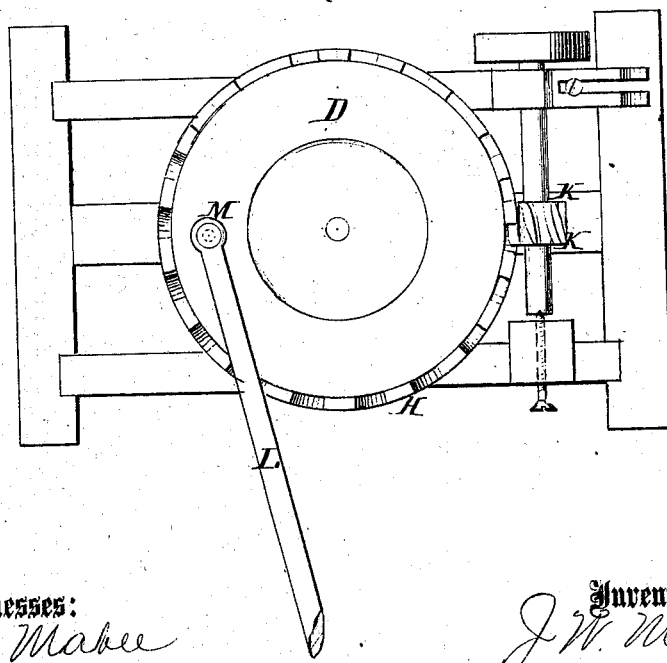
Figure 2 is a plan view of a modification, showing a convenient way for the application of steam-power.

In fig. 2 I have represented a plan for the application of steam-power by attaching the connecting-rod L of the steam-engine to a wrist-pin, M, on the upper face of the driving-wheel D, placed on the top of the shaft and at the top of the frame A, the counter-shaft and pinion being also placed at the top.

Having thus described my invention—

What I claim as new, and desire to secure by Letters Patent, is—

The employment in a horse or other power apparatus, substantially as specified, of a driving-wheel, D, and pinion E, provided with teeth L K, arranged and operating substantially as specified.

JAMES W. MURRELL.

Witnesses:
JOHN H. MORRIS,
WM. C. LANGFORD.